(12) United States Patent
Medvinsky

(10) Patent No.: US 6,792,534 B2
(45) Date of Patent: Sep. 14, 2004

(54) END-TO END PROTECTION OF MEDIA STREAM ENCRYPTION KEYS FOR VOICE-OVER-IP SYSTEMS

(75) Inventor: Alexander Medvinsky, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 10/140,148

(22) Filed: May 6, 2002

(65) Prior Publication Data

US 2003/0182553 A1 Sep. 25, 2003

Related U.S. Application Data

(60) Provisional application No. 60/367,082, filed on Mar. 22, 2002.

(51) Int. Cl.[7] .................................................. H04L 9/00
(52) U.S. Cl. ........................ 713/171; 713/156; 380/259; 380/277
(58) Field of Search ................................. 380/277–279, 380/44, 259–260, 42, 29, 255; 713/171, 156, 173, 175–176, 168–169, 200–201; 370/464, 477; 704/200, 500

(56) References Cited

U.S. PATENT DOCUMENTS

| 4,803,725 | A | * | 2/1989 | Horne et al. .................. 380/44 |
| 5,115,466 | A | * | 5/1992 | Presttun ...................... 380/257 |
| 5,535,276 | A | * | 7/1996 | Ganesan ...................... 713/155 |
| 6,031,913 | A | * | 2/2000 | Hassan et al. ................ 380/44 |
| 6,225,888 | B1 | * | 5/2001 | Juopperi ..................... 340/5.8 |
| 6,377,690 | B1 | * | 4/2002 | Witschorik .................. 380/268 |

OTHER PUBLICATIONS

Schneier, Applied Cryptography, 1996,Jihn Wiley & Sons, Inc,second edition,pp. 566–569.*

* cited by examiner

Primary Examiner—Kim Vu
Assistant Examiner—Hosuk Song
(74) Attorney, Agent, or Firm—Townsend and Townsend and Crew LLP

(57) ABSTRACT

The present invention reduces the exposure of keying material to intermediary devices in a communication channel between first and second servers. In one embodiment, a second server receives a first half of media stream keys from a first server. The second server uses a Kerberos-based Application Request and tickets to communicate the second half of the media stream keys to the first server. Using this approach, the exposure of the media stream keys is reduced to only the servers.

15 Claims, 2 Drawing Sheets

END-TO END PROTECTION OF MEDIA STREAM ENCRYPTION KEYS FOR VOICE-OVER-IP SYSTEMS

CROSS-REFERENCES TO RELATED APPLICATIONS

This application claims priority from co-pending U.S. Provisional Patent Application No. 60/367,082 filed Mar. 22, 2002 entitled END-TO-END PROTECTION OF MEDIA STREAM ENCRYPTION KEYS FOR VOICE-OVER-IP SYSTEMS which is hereby incorporated by reference, as if set forth in full in this document, for all purposes.

BACKGROUND OF THE INVENTION

The present invention relates in general to secure data transmission and more specifically to secure data transmission in end-to-end communication systems that use call signaling to exchange keys using intermediary transfers.

Secure communication of digital information is very important in many of today's systems. For example, in a typical voice-over-Internet-Protocol ("voice-over-IP," or "VoIP") system a Call Management Server (CMS) is operated by a VoIP service provider. The CMS interfaces with a user of a digital telephone and with another CMS at a remote location that, in turn, interfaces with another user of a digital telephone (or Multimedia Terminal Adapter (MTA)). Such a system allows the users to speak with each other over a large network such as the Internet.

Naturally, users would like their conversations (and other data exchanges) to be secure. However, it is difficult to maintain a high level of security over a large, amorphous network, such as the Internet, where information may go through many servers, switches, routers, hubs, and other intermediary devices before arriving at an intended destination. One approach to maintain security is to have the two CMSs exchange "media stream keys" to be used during a phone call. Several approaches to exchanging such keys exist in the prior art. For example, PacketCable call signaling protocols can be used. However, these approaches still require a transfer of keying material from a first CMS to a second CMS, and then a subsequent exchange of keying material from the second CMS to the first CMS. When keys (or other data) are exchanged in this manner, the keys are subjected to intermediary devices twice. Since each intermediary device is a potential security threat to data it is desirable to minimize the exposure of the keys to the intermediary devices.

In a system using a PacketCable approach, the call signaling protocol between two telephones, or VoIP terminals or MTAs, is called Network-Based Call Signaling (NCS). Each call signaling interface between an MTA and a CMS is secured at the network layer. In the case that each of the MTAs participating in a VoIP connection is controlled by a separate CMS, the CMS to CMS signaling protocol is based on Session Initiation Protocol (SIP). SIP, and other standards, are used to define exchange and management of keys, such as session keys and media stream keys. Also, authentication information and other related data may be transferred to initiate a session. This material is referred to collectively as "keying material."

SUMMARY OF THE INVENTION

The present invention reduces the exposure of keying material to intermediary devices in a communication channel between first and second servers. In one embodiment, a second server receives a first half of media stream keys from a first server. The second server uses a Kerberos-based Application Request and tickets to communicate the second half of the media stream keys to the first server. Using this approach, the exposure of the media stream keys is reduced to only the first and second servers.

In one embodiment the invention provides a method for exchanging keys between first and second servers, wherein a communication path between the first and second servers includes one or more intermediary transfer devices. The method comprises receiving, at the second server, a portion of media stream keys to be used in a subsequent data transmission; using a security mechanism to protect additional portions of media stream keys to be used in a subsequent transmission; and transferring the protected additional portions of media stream keys to the first server via the one or more intermediary transfer devices.

DETAILED DESCRIPTION OF THE INVENTION

Figure 1:
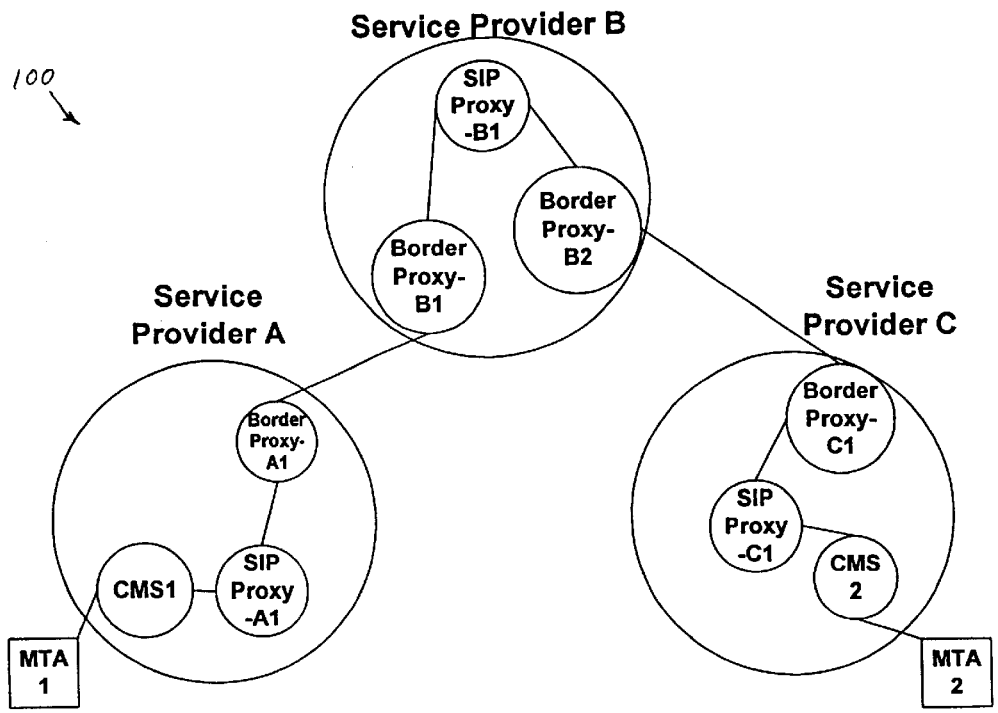
FIG. 1 is a diagram illustrating a signaling path between service providers.

In FIG. 1, system 100 includes first and second Multimedia Terminal Adapters (MTAs), MTA1 and MTA2, respectively. A Call Management Server (CMS) is provided by different service providers. CMS1 receives data from MTA1 and performs processing and signaling to set up secure communications with a desired target. In this case, MTA2 is the desired target.

In general, a VoIP call may occur between two separate VoIP service providers, each of which owns its own CMSs. The call signaling messages may be routed between intermediate signaling proxies (called SIP proxies) between CMSs and can even be routed through intermediate service providers.

Calls originated by MTA1 are controlled by CMS1. CMS1, uses call routing information to forward a SIP message to SIP Proxy-A1. SIP Proxy-A1 routes the message to Border Proxy-A1. Border Proxy-A1 routes the message to an intermediate Service Provider B. A signaling message is then routed through several SIP proxies within Service Provider B and also through SIP proxies within Service Provider C. The message finally reaches CMS2 and its destination at MTA2.

Note that any number of intermediate proxies might be used. In general, an intermediate, or intermediary, proxy can be a device or process that receives and relays a signaling message, or other information. A description of the use of intermediate signaling proxies is described, for example, in "SIP: Session Initiation Protocol," IETF Request for Comments 2543, March 1999. This reference is hereby incorporated by reference for all purposes, as if set forth in full in this document.

In a preferred embodiment, a PacketCable signaling architecture is used. The PacketCable architecture assumes that each CMS and SIP Proxy performs a lookup of a destination phone number and, as a result, obtains the address of the next host to which it should forward a SIP signaling message. That next host may be the destination CMS or it may be some intermediate SIP proxy. An SIP Proxy that interfaces to another SIP Proxy that is in a different signaling domain is called a Border Proxy. A single VoIP Service Provider may, in general, consist of one or more signaling domains.

Typically, when a call-originating MTA initiates a signaling message, that initial message includes one-half of the keying material to be used in the session. The call-answering MTA, MTA2 in the example of FIG. 1, responds with a second half of the keying material. When either of the MTAs include keying material in a message, that keying material is exposed not just at the two CMSs, but also at each intermediate proxy. Although each SIP Proxy may be owned and operated by a trusted Service Provider, this signaling architecture exposes media stream keys at a potentially large number of nodes. A compromise of any one of these nodes can compromise media stream privacy.

When MTA1 generates its portion (e.g., one-half) of the keying material and sends it to CMS1, CMS1 has no choice but to deliver the keying material through the intermediate SIP proxies, since CMS1 does not know the identity of CMS2. However, after the first call signaling message had been received by CMS2 only half of the media stream keys had been exposed at the intermediate SIP proxies.

At this point none of the SIP proxies possess the full media stream keys. Also, CMS2 knows the identity of CMS1. It is now possible for CMS2 to encrypt the remaining halfs of the keys before they are returned back to CMS1. Even though the return signaling message will transit back through the SIP proxies, the relevant media stream key management material may be encrypted so that it can be decrypted only by CMS1 (and then forwarded to MTA1). This can be accomplished with application-layer security, since within the PacketCable architecture the first signaling message coming back from CMS2 to CMS1 is routed through intermediate SIP proxies.

One way to secure half of the media stream keys at CMS2 would be for CMS2 to look up CMS1's digital certificate and then use it to encrypt the keying material. A cryptographic accelerator at one or more of the CMSs can be used to improve the speed of such an approach.

Alternatively, CMS1 and CMS2 could negotiate some symmetric key ahead of time and then CMS2 would use it to encrypt half of the media stream keys. This would require a CMS to maintain a separate table of encryption keys for application-layer security in addition to the IPSec keys it already has to maintain. One drawback of this approach is that it requires more processing "overhead" due to obtaining and maintaining the keys.

A preferred embodiment of the invention uses a popular authentication service called Kerberos. Since the Packet-Cable architecture already utilizes Kerberos key management for both IPSec and for the creation of keys, it is anticipated that each MTA and CMS in standard systems will have support for Kerberos. Note that, although the preferred embodiment uses Kerberos mechanisms, other authentication services or secure data transfer techniques can be used with the invention. Details on the Kerberos key management protocol can be found in, e.g., "The Kerberos Network Authentication Service (V5)," IETF Request for Comments 1510, September 1993.

Figure 2:
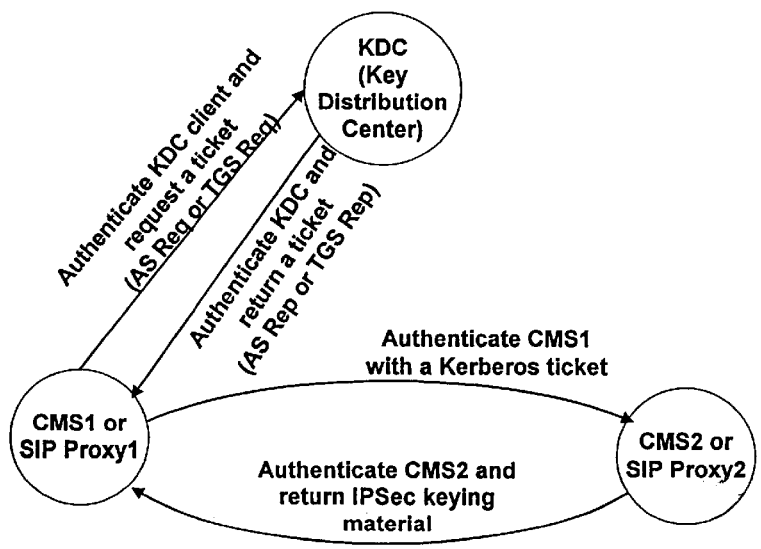
FIG. 2 shows an overview of establishing security associations.

FIG. 2 shows an overview of how Kerberos is used to establish IPSec SAs (Security Associations) between a pair of CMSs or SIP Proxies, where an IPSec SA includes a set of symmetric keys used to encrypt and authenticate IP packets. FIG. 2 shows that first CMS1 authenticates itself to a Key Distribution Center (KDC), a trusted authority that shares symmetric keys with each of its clients. This can be done by sending either an Authentication (AS) Request or a Ticket Granting Service (TGS) Request message. KDC would likewise authenticate itself in the return message (AS Reply or TGS Reply) to CMS 1 and would include in the reply a Kerberos ticket.

A Kerberos ticket is similar to a digital certificate, in that a holder of a ticket can use it to authenticate itself to another party. Alternatively, any type of digital certificate can be used. However, unlike general digital certificates, a Kerberos ticket can be used for authentication only to a specified server—the one that is named in the ticket. A ticket can also be encrypted using a much faster symmetric key cryptography and carries less overhead than a digital certificate.

Although a preferred embodiment of the invention uses Kerberos tickets, other embodiments can use different security mechanisms. For example, other (i.e., non-Kerberos) formats of tickets can be used. Tickets, certificates, authenticators, digital signatures, or other security mechanisms can be used in place of, or to supplement, the security mechanisms used by the preferred embodiment of the present invention.

After CMS1 receives a ticket, it is able to authenticate itself to CMS2 and likewise CMS2 would authenticate itself to CMS1 and they would be able to establish a shared set of IPSec keys. Kerberized IPSec is specified in, e.g., "Packet-CableTM Security Specification," PKT-SP-SEC-I02-001229, Cable Television Laboratories, Inc., December 2000.

A preferred embodiment allows CMS2 to obtain a Kerberos ticket for CMS1 and then use the ticket to encrypt and authenticate half of the media stream keys as well as selected cryptographic algorithms and data (i.e., "ciphersuites"). The resulting Kerberos authenticator, media stream keys and selected ciphersuites are returned inside SDP options as before. Note that in this case it will be CMS2 obtaining a ticket for CMS1, as opposed to the case shown in FIG. 2.

Figure 3:
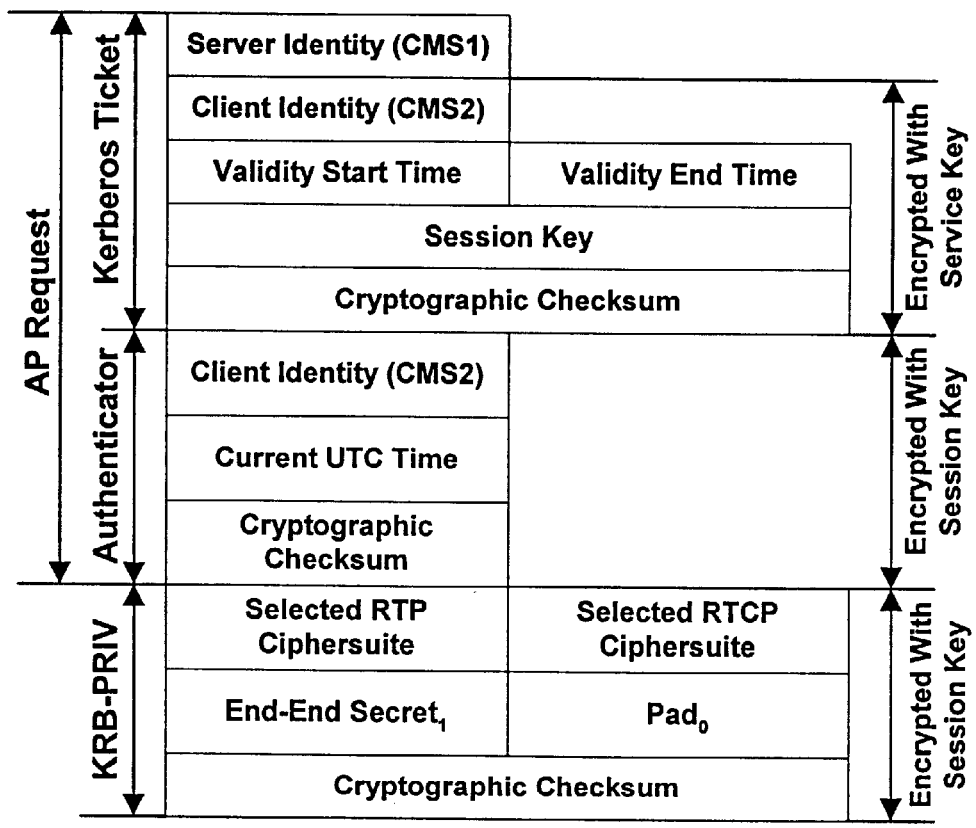
FIG. 3 shows encrypted and authenticated media stream key management information inside a Kerberos structure.

FIG. 3 shows encrypted and authenticated media stream key management information inside a KRB-PRIV Kerberos structure. The KRB-PRIV structure is preceded with a Kerberos Application (AP) Request object, which contains a Kerberos ticket. For ease of illustration, only relevant Kerberos objects are discussed herein. Details of the Kerberos service can be found in the cited reference and other appropriate references. The ticket itself is encrypted using a symmetric Service Key that is shared only between CMS1 and the KDC but is not available to CMS2 or to any other node in the network. Thus, this particular ticket can be decrypted and verified by CMS1 (the intended target of this SDP content) but cannot be altered by CMS2 which does not possess the Service Key needed to decrypt the ticket. This means that CMS2, the holder of the ticket, is not capable of falsifying the information contained in the ticket without being detected. As mentioned, above, alternative embodiments can use a digital certificate, or other form of security protection mechanism.

The ticket includes a symmetric Session Key. Although CMS2 is not capable of decrypting the ticket and reading its contents, it has its own copy of exactly the same Session Key that was securely delivered to it by the KDC (e.g., inside an AS Reply or TGS Reply message). CMS2 already possesses the session key and CMS1 is capable of decrypting the ticket and extracting the Session Key from it. Once CMS1 receives this ticket, it will share the session key with CMS2.

A preferred embodiment of the invention uses the session key to both encrypt and authenticate the media stream key management information, including half of the media stream keys and selected ciphersuites. The ticket is sent along with this secured information, so that CMS1 will be able to extract the session key needed for decryption and validation of the key management data. However, for complete Kerberos authentication it is not enough to only send a ticket. In order for CMS2 to authenticate itself to CMS1, it has to send an AP Request (that includes the ticket).

The only additional messages that would be introduced by this solution would be the exchange between CMS2 and the KDC to obtain a Kerberos ticket for CMS1. However, Kerberos tickets are normally cached and reused until some expiration time—they can last up to 1 week in PacketCable. So, this overhead would only affect a small percentage of calls. Furthermore, since CMS2 and CMS1 also exchange some signaling messages directly, eventually they will require IPSec Security Associations and so the same Kerberos ticket can be reused for that purpose.

In the preferred embodiment, a ticket is an authentication token given out to a client by the KDC. Among other information, a ticket contains the name of the client, name of a specific server and a session key (a symmetric encryption key). The client name and session key need to be kept secret and are encrypted with another key, called a service key. The service key is a secret key that is known only to the KDC and the server named in the ticket. Because the client does not also possess this service key, it does not have the ability to decrypt the ticket and change its contents. Normally, the client also needs to know the session key and since it cannot get it out of the ticket, the KDC sends to this client a separate copy of the same session key.

In order to authenticate a message with a ticket, a client would include in this message both a ticket and an authenticator which includes a keyed checksum computed using the session key present in the ticket. Note that the session key in the ticket is encrypted with the server's service key. When the server named in the ticket receives this message from the client, it is able to decrypt the ticket with its service key, verify the client name and obtain the session key. The session key is then subsequently used to verify the keyed checksum and thus authenticate the message.

Thus, the present invention reduces the exposure of keying material. Although the invention has been discussed with respect to Kerberos, other embodiments may use other approaches. However, Kerberos is an integral part of the PacketCable security architecture and therefore its use does not require an introduction of a new protocol or a new key management infrastructure. Also, Kerberos provides a key management solution that avoids the overhead that is associated with a PKI (Public Key Infrastructure). This provides an efficient solution to the problem of the exposure of the media stream keys at intermediate network elements.

Note that other embodiments of the invention need not be systems based on the PacketCable architecture. The scope of the invention is to be determined solely by the appended claims.

What is claimed is:

1. A method for exchanging a symmetric media stream key between first and second call management servers, wherein a communication path between the first and second call management servers includes one or more intermediary transfer devices, the first and second call management servers exchanging a plurality of call signaling messages via the one or more intermediary transfer devices, wherein the one or more intermediary transfer devices are configured to handle and forward the plurality of call signaling messages, the method comprising:

receiving, at the second call management server, a first portion of the symmetric media stream key to be used in a subsequent data transmission between the first and second call management servers, wherein the first portion of the symmetric media stream key is unprotected during its transmission from the first call management server to the second call management server via the one or more intermediary transfer devices;

using a security mechanism to protect a second portion of the symmetric media stream key to be used in the subsequent data transmission;

upon receiving the first portion of the symmetric media stream key, transferring the protected second portion of the symmetric media stream key from the second call management server to the first call management server via the one or more intermediary transfer devices;

upon receiving the protected second portion of the symmetric media stream key at the first call management server, using the first portion and the protected second portion of the symmetric media stream key to secure communications between the first and second call management servers;

wherein the one or more intermediary transfer devices are unable to decrypt the protected second portion of the symmetric media stream key.

2. The method of claim 1, wherein the security mechanism includes using a ticket.

3. The method of claim 2, wherein the ticket adheres to a Kerberos standard.

4. The method of claim 1, wherein the security mechanism includes using a certificate.

5. The method of claim 1, wherein the security mechanism includes using an authenticator.

6. The method of claim 1, wherein the security mechanism includes using a digital signature.

7. The method of claim 1, wherein media stream session information is encrypted, authenticated and transferred with the protected second portion of the symmetric media stream key to the first call management server.

8. The method of claim 7, wherein the media stream session information is not encrypted.

9. The method of claim 1, wherein the first and second call management servers are call management servers in a Voice-Over-Internet-Protocol system; and wherein the first call management server initially only has information relating to a destination phone number and has no IP address or host name information on the second call management server.

10. The method of claim 1, further comprising:

sending an application request from the second call management server to the first call management server.

11. The method of claim 10, wherein the application request includes a Kerberos ticket.

12. The method of claim 11, wherein the Kerberos ticket is encrypted using a symmetric service key.

13. The method of claim 11, wherein the Kerberos ticket includes a symmetric session key.

14. An apparatus for exchanging a symmetric media stream key between first and second call management servers, wherein a communication path between the first and second call management servers includes one or more intermediary transfer devices, the first and second call management servers exchanging a plurality of call signaling messages via the one or more intermediary transfer devices, the apparatus comprising
- a receiving process at the second call management server for receiving a first portion of the symmetric media stream key to be used in a subsequent data transmission between the first and second call management servers;
- a security mechanism at the second call management server configured to generate a protected form of a second portion of the symmetric media stream key to be used in the subsequent data transmission upon receiving the first portion of the symmetric media stream key; and
- a send process for transferring the protected form of the second portion of the symmetric media stream key to the first call management server from the second call management server via the one or more intermediary transfer devices;
- a communication process for establishing communication between the first and second call management servers using the first portion and the second protected portion of the symmetric media stream key;
- wherein the one or more intermediary transfer devices are unable to decrypt the protected form of the second portion of the symmetric media stream key.

15. A method for exchanging a symmetric media stream key between a first call management server and a second call management sewer in a Voice-Over-Internet-Protocol system, wherein a communication path between the first and second call management servers includes one or more intermediary proxies, the first and second call management servers exchanging a plurality of call signaling messages via the one or more intermediary proxies in order to establish a call, the method comprising:
- sending a first portion of the symmetric media stream key from the first call management server to the second call management server;
- receiving at the second call management server the first portion of the symmetric media stream key;
- using a Kerberos ticket to encrypt a second portion of the symmetric media stream key;
- transferring the encrypted second portion of the symmetric media stream key from the second call management server to the first call management server via the one or more intermediary proxies; and
- using the first and second portions of the symmetric media stream key to secure a call session between the first and second call management servers;
- wherein the one or more intermediary proxies are unable to decrypt the encrypted second portion of the symmetric media stream key.

* * * * *

UNITED STATES PATENT AND TRADEMARK OFFICE
CERTIFICATE OF CORRECTION

PATENT NO.    : 6,792,534 B2
DATED         : September 14, 2004
INVENTOR(S)   : Medvinsky, Alexandar It is certified that error appears in the above-identified patent and that said Letters Patent is hereby corrected as shown below:

Column 8,
Line 1, the word "sewer" should read -- server --.

Signed and Sealed this

Sixteenth Day of November, 2004

JON W. DUDAS
*Director of the United States Patent and Trademark Office*